(12) United States Patent
Realegeno-Amaya

(10) Patent No.: US 8,646,786 B2
(45) Date of Patent: Feb. 11, 2014

(54) LOW PROFILE DOLLY

(76) Inventor: Julio Realegeno-Amaya, Ottawa (CA)

( * ) Notice: Subject to any disclaimer, the term of this patent is extended or adjusted under 35 U.S.C. 154(b) by 0 days.

(21) Appl. No.: 13/333,389

(22) Filed: Dec. 21, 2011

(65) Prior Publication Data

US 2012/0091676 A1 Apr. 19, 2012

Related U.S. Application Data

(62) Division of application No. 12/484,684, filed on Jun. 15, 2009.

(51) Int. Cl.
*B62B 1/00* (2006.01)

(52) U.S. Cl.
USPC .................... 280/79.11; 280/47.24

(58) Field of Classification Search
USPC ............... 280/79.2, 79.3, 79.7, 79.11, 79.5, 280/43.12, 43.17, 47.34, 47.24, 11.25, 280/33.998, 638, 79.4, 32.6
See application file for complete search history.

(56) References Cited

U.S. PATENT DOCUMENTS

| | | | | |
|---|---|---|---|---|
| 2,843,280 A * | 7/1958 | Stopps | ............ | 414/607 |
| 3,024,036 A | 3/1962 | Reynolds | | |
| 3,139,288 A | 6/1964 | Peterson | | |
| 3,476,399 A * | 11/1969 | Finn | ............ | 280/11.25 |
| 4,127,202 A * | 11/1978 | Jennings et al. | ............ | 280/79.11 |
| 4,166,638 A * | 9/1979 | De Prado | ............ | 280/79.11 |
| 4,203,609 A | 5/1980 | Mitchell et al. | | |
| 4,213,624 A * | 7/1980 | Sanders | ............ | 280/43.12 |
| 4,637,626 A * | 1/1987 | Foss et al. | ............ | 280/655 |
| 4,669,944 A * | 6/1987 | Tarbell | ............ | 414/476 |
| 4,887,836 A | 12/1989 | Simjian | | |
| 5,180,178 A | 1/1993 | Caceres | | |
| 5,358,264 A * | 10/1994 | Hewitt | ............ | 280/79.11 |
| 5,653,458 A | 8/1997 | Chaparian | | |
| 5,927,731 A * | 7/1999 | Clarke | ............ | 280/79.7 |
| 6,199,879 B1 * | 3/2001 | Cino et al. | ............ | 280/79.2 |
| 6,345,828 B1 * | 2/2002 | Pool et al. | ............ | 280/32.6 |
| 6,386,560 B2 * | 5/2002 | Calender | ............ | 280/47.34 |
| 6,880,837 B2 | 4/2005 | Nandram et al. | | |
| 6,974,140 B2 * | 12/2005 | Neuman | ............ | 280/79.11 |
| 7,014,200 B2 | 3/2006 | Calmeise et al. | | |
| 7,036,833 B1 | 5/2006 | Berna et al. | | |
| 7,044,569 B1 | 5/2006 | Relyea et al. | | |
| 7,207,578 B2 * | 4/2007 | Shore | ............ | 280/79.7 |
| 7,281,720 B1 * | 10/2007 | Richards | ............ | 280/79.5 |
| 7,441,786 B2 * | 10/2008 | Stryker et al. | ............ | 280/79.11 |
| 7,500,683 B2 * | 3/2009 | Desbiens | ............ | 280/47.34 |
| 7,513,511 B2 * | 4/2009 | Chaseateau | ............ | 280/47.27 |
| 7,543,842 B1 | 6/2009 | Fiorini | | |
| 7,600,767 B2 * | 10/2009 | Lewis | ............ | 280/79.7 |
| 8,011,677 B1 * | 9/2011 | Ellington et al. | ............ | 280/43.12 |
| 8,091,905 B2 * | 1/2012 | Chen | ............ | 280/79.4 |
| 8,360,443 B2 * | 1/2013 | Ellington | ............ | 280/43.12 |
| 2003/0038439 A1 * | 2/2003 | Novak et al. | ............ | 280/79.7 |
| 2009/0155035 A1 | 6/2009 | Lundin | | |
| 2010/0295261 A1 * | 11/2010 | Ellington | ............ | 280/43.12 |

* cited by examiner

*Primary Examiner* — Hau Phan
(74) *Attorney, Agent, or Firm* — Price Heneveld LLP

(57) ABSTRACT

A dolly consists of a generally planar platform having opposed front and rear ends and lateral sides. The wheels are configured to contact a surface so as to support the platform above the surface when the platform is placed on the surface. The platform is relatively low to the ground, and enables one operator to arrange and transport heavy loads with the dolly.

19 Claims, 5 Drawing Sheets

LOW PROFILE DOLLY

CROSS-REFERENCE TO RELATED APPLICATION

This application is a division of U.S. patent application Ser. No. 12/484,684 entitled LOW PROFILE REVERSIBLE DOLLY filed on Jun. 15, 2009, the disclosure of which is hereby incorporated by reference in its entirety.

FIELD OF THE INVENTION

The present invention relates to a low profile dolly for transporting office furniture including filing cabinets and the like and various other articles.

BACKGROUND

During a move or renovation project in an office or other setting, many different types of articles and pieces of furniture are often required to be moved. Such items can range from boxes to shelves, desks, filing cabinets and various other items. Although these items can be moved manually by a mover or contractor, a dolly or similar type of apparatus is generally preferred, as it makes the move less physically demanding and is often quicker.

Depending on the nature of the article or piece of furniture to be transported, different types of dollies may be utilized. For example, a standard upright vertical dolly may be used for transporting boxes, whereas other larger items such as shelves may be placed on a horizontal cart-style dolly for transportation. By contrast, lateral filing cabinets or other items having wheels on the bottom and the ability to roll, may be moved with dollies similar to those which are disclosed in U.S. Pat. No. 6,880,837 to Nandram et al. and U.S. Pat. No. 3,024,036 to Reynolds, both of which essentially consist of a flat platform mounted on four wheels and having side walls to prevent the filing cabinet from sliding off the platform.

Having to rely on several types of dollies to complete a move or to transport and relocate various items during a renovation project is not ideal, as it is cumbersome and time consuming for a tradesperson or mover to transport multiple pieces of equipment to a job site. Moreover, storage of such equipment is also a concern, as additional equipment requires additional space for storage purposes.

The use of multiple different dollies to perform tasks also reduces efficiency, as the user must constantly switch back and forth between different pieces of equipment. Moreover, having multiple pieces of equipment on site can create a cluttered working environment, which can be a safety concern and the way of ongoing renovations and work.

Thus, there is a need to provide a more versatile dolly that is capable of supporting and transporting a variety of different types of articles by a user so as not to necessitate the use of numerous dollies or pieces of equipment to perform a job.

SUMMARY OF THE INVENTION

According to one aspect of the invention there is provided a low profile dolly. A plurality of wheels are mounted to the dolly. The wheels are configured to contact a surface so as to support the platform above the surface when the dolly is placed on the surface.

In some embodiments, the dolly is reversible, such that the dolly is useable either in an upright position, wherein a first face of the load carrying upwardly to support a load or in an inverted platform faces position in which an opposed face of the platform faces upwardly so as to carry a different type of load. The dolly includes a generally planar platform having opposed front and rear ends, lateral sides, an upper face and a lower face. It further includes a bumper at least partially surrounding the platform and protruding above the upper face when the upper face is facing upwardly.

In some embodiments, the dolly has a first and second mode. In the first mode the upper face faces upwardly and in a second mode the lower face faces upwardly. The platform is supported by the wheels above the surface when in either the first mode or the second mode so as to selectively carry a load.

The wheels are configured such that the platform is relatively close to the surface in the first mode and the platform is relatively higher off the surface when in the second mode.

In the first mode, the dolly is capable of transporting items such as filing cabinets and the like which are relatively heavy and where a low to the ground carrying surface, with a bumper to prevent slippage of the load, is desirable. In its second mode, the dolly is adapted to carry a wide variety of other items ranging from boxes, to shelves, desks, partitions or other household or office items or pieces of furniture. In the second mode, it is desirable to provide a platform with unobstructed sides to permit a large load to overhang the sides and/or an end of the dolly.

In other embodiments of the invention, the dolly is not reversible as it operates in one mode only, namely that the carry surface is low to the ground. In this embodiment, the dolly does not have a bumper. The dolly is adapted to carry a wide variety of loads as the platform has unobstructed sides, thereby permitting the load to overhand the sides and or end of the dolly.

BRIEF DESCRIPTION OF THE DRAWINGS

These and other advantages of the invention will become apparent upon reading the following detailed description and upon referring to the drawings in which.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The term "dolly" as used herein refers to any type of wheeled, non-motorized cart capable of carrying cargo.

Directional references such as "upper", "lower", "upright" etc. are purely for ease of description and are not limitative.

As shown in FIGS. 1 to 7, one embodiment according to the present invention is a reversible dolly that is operational in both a first mode and a second mode. As will be seen, the first and second modes consist of upright and inverted positions. It will be further understood that such terms are for convenience of description, in that either mode may be considered the "upright" orientation.

Figure 1:
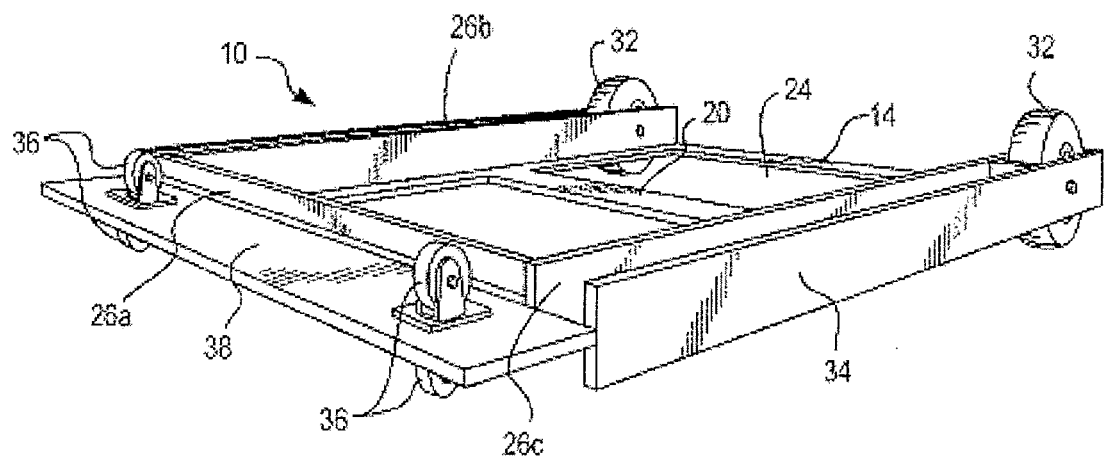
FIG. 1 is a perspective view of an embodiment according to the present invention in a first mode.
Figure 2:
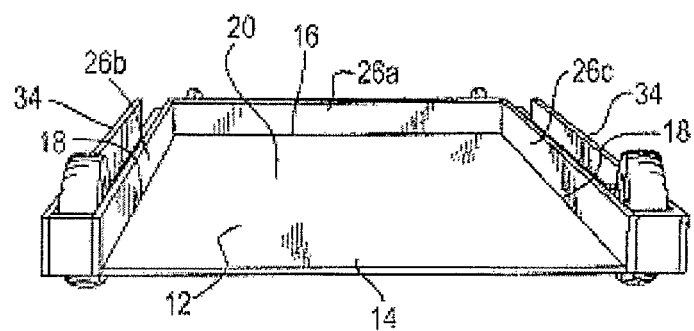
FIG. 2 is a first end view of an embodiment of according to the present invention in a first mode.

As shown in FIGS. 1 to 7, the dolly 10 includes a generally planar platform 12 having opposed front 14 and rear 16 ends and lateral sides 18, an upper face 20 and a lower lace 22. The platform may consist of a single solid rectangular sheet, as shown in FIG. 2 or, as shown in FIGS. 1 and 3 to 7, it may have one or more cut out portions 24, to reduce the overall weight of the dolly and decrease the physical demand on the user. It is contemplated that the platform includes a flat rectangular panel. However, it may take on a different configuration depending on the needs of the user.

Figure 3:
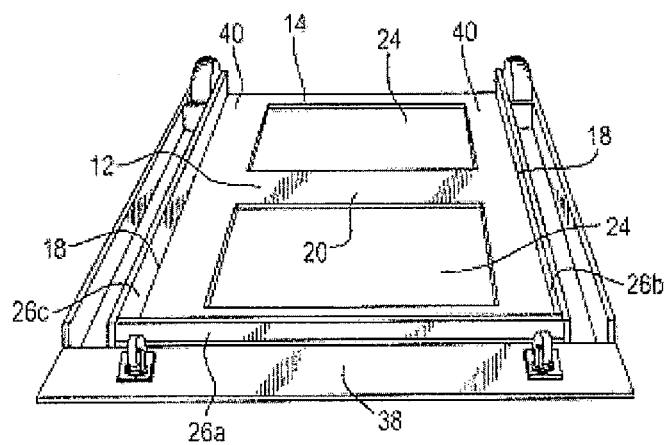
FIG. 3 is a second end view of an embodiment according to the present invention in a first mode.
Figure 4:
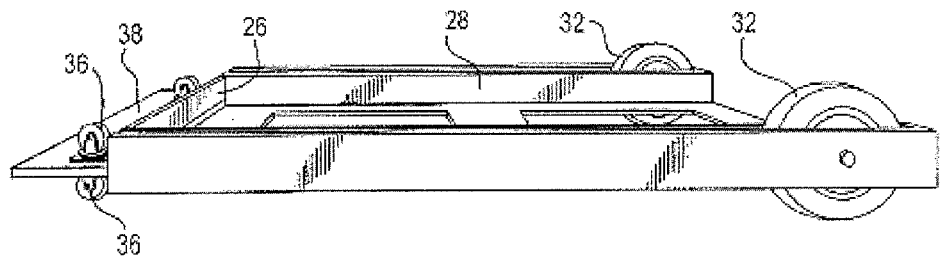
FIG. 4 is a side elevational view of the wheel region of the an embodiment according to the present invention in a first mode.

As shown in FIGS. 1 to 3, the platform 12 is at least partially surrounded by a bumper that protrudes above the upper face of the platform when the dolly is in a first mode and the upper face 20 is facing upwardly as shown in FIGS. 1 to 3. The bumper may consist solely of a single end wall member 26a located at an end of the platform or it may further include a first side wall member 26b and a second side wall member 26c which extend upwardly from one or both of the lateral sides 18 of the platform, when the platform is in the first mode and the upper lace 20 is facing upwardly. In general terms, the bumper may protrude from between one and three ends and/or sides of the platform. The bumper may protrude from any of the sides or ends of the platform. It is contemplated that at least one side or end remain unobstructed to permit an object to be pushed onto the platform, although for certain specialized uses it may be desirable for the bumper to protrude from all ends and sides of the platform.

A plurality of wheels are mounted to the dolly. The wheels are configured to contact the ground or a surface so as to support the platform 12 above the ground or surface when the dolly is positioned in either a first mode when the upper face 20 faces upwardly or in a second mode inverted from the first mode, when the lower face 22 faces upwardly. In this manner, the wheels above the surface or the platform is supported by ground when the dolly is in either the first mode or the second mode, so as to selectively carry a load, on either face of the platform.

Figure 5:
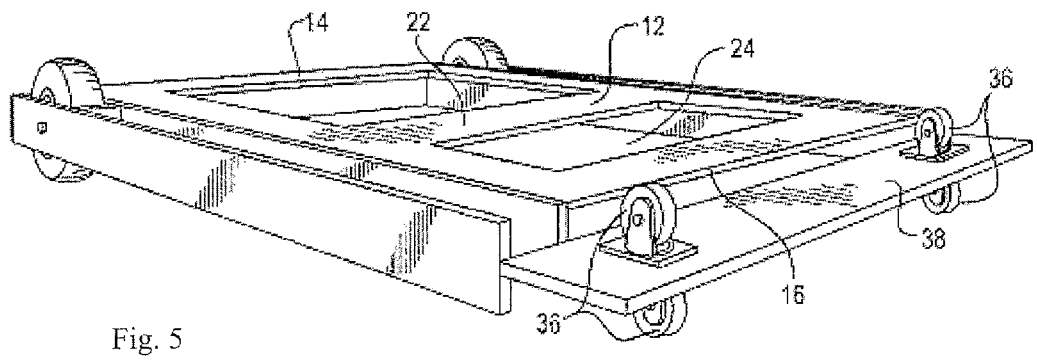
FIG. 5 is a perspective view of an embodiment according to the present invention in a second mode.
Figure 6:
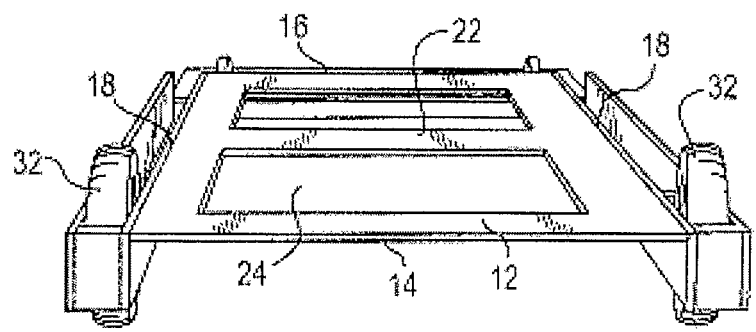
FIG. 6 is a first end view of an embodiment according to the present invention in a second mode.
Figure 7:
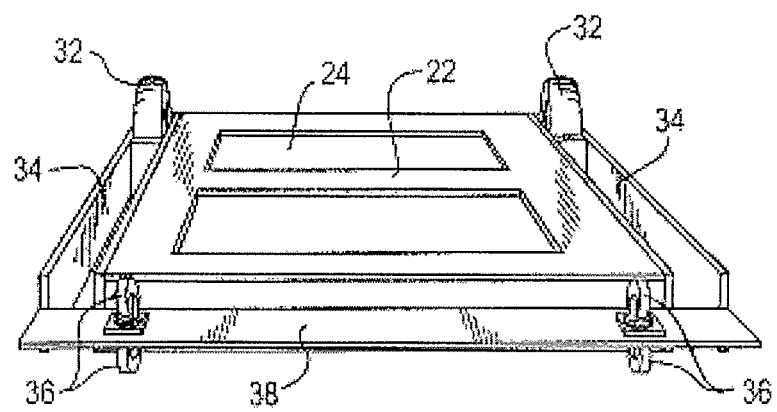
FIG. 7 is a second end view of an embodiment according to the present invention in a second mode.

The wheels are configured such that the platform is relatively close to the ground or surface when the dolly is in the first mode, as shown in FIGS. 1 to 3 and such that the platform is relatively higher off the ground or surface compared to when the dolly is in the second mode, as shown in FIGS. 5 to 7. Preferably, the upper face 20 of the platform is no more than ¾ to 1 inch above the ground or the surface when the dolly is in the first mode. The first mode can be said to be a low profile mode. However, the elevation of the platform in either mode is based on the desired use of the dolly and may depart from this range.

The plurality of wheels typically includes two rear wheels 32 located at opposing lateral sides 18 at the front end 14 of the platform, which are mounted to the first side wall member 26b and the second side wall member 26c, respectively of the bumper or directly to the platform itself. The rear wheels are relatively large and protrude beyond both the upper face and bumper, and the lower face of the platform and the bumper so as to contact the ground or a surface when the dolly is in either the first mode or the second mode. A pair of spaced apart side members 34 provide structural support to the dolly and hold the large wheels. The large wheels are formatted on an axle which horizontally spans the spaced apart side members. The wheels can be pneumatic or solid.

The plurality of wheels typically further includes one or more vertically opposing wheel sets 36. Each wheel set typically includes a first wheel positioned and configured to support the dolly in the first mode and a second wheel being configured to support the dolly in the second mode. The first and second wheels each only protrude above a single respective face (and bumper, where present), respectively. The one or more vertically opposing wheel sets 36 are attached to a horizontal shelf 38 which protrudes from the platform at a mid-point on the exterior of the bumper. The axes of rotation of the first wheel and the second wheel of each vertically opposing wheel set 36 are parallel to one another. The wheels may be vertically displaced or as shown in FIGS. 1 to 7, they may be directly opposed to one another in a stacked vertical array. Preferably, the dolly includes two opposing wheel sets, which are spaced horizontally apart from one another on the shelf 38. The wheels forming the opposing wheel sets are preferably castor wheels. Optionally, the wheels of the dolly may comprise any combination of the smaller opposed wheel sets and large unopposed wheels. However, an advantage of the configuration described herein is that one or more of the upwardly facing wheels of the wheel sets can be positioned to assist in the loading of a heavy object onto the platform.

When the dolly is in the first mode, with the upper face facing upwardly and the bumper protruding above the upper face 20, the dolly is suitable for carrying filing cabinets or other items of furniture, as the bumper serves to prevent the cabinet or furniture from sliding off the platform. In addition, when in the first mode, the platform is relatively close to the ground which makes it easier to tilt and roll a filing cabinet or slide another piece of furniture or article onto the platform to be transported. In the first mode, the dolly is configured to be used by one operator to arrange and transport the load onto the dolly.

If the platform is constructed so as to include one or more cut-out portions 24 to reduce the weight of the dolly, it may also include a pair of smooth runners 40, spaced apart the distance between the feet of a standard filing cabinet as shown in FIG. 3.

When the dolly is in the second mode, the platform has an at least partially unobstructed lower face to permit a load to overhang the edges of the lower face. It is also relatively higher off the ground to make it easier for the operator to load boxes and other articles onto the lower face of the platform for transportation.

Figure 8:
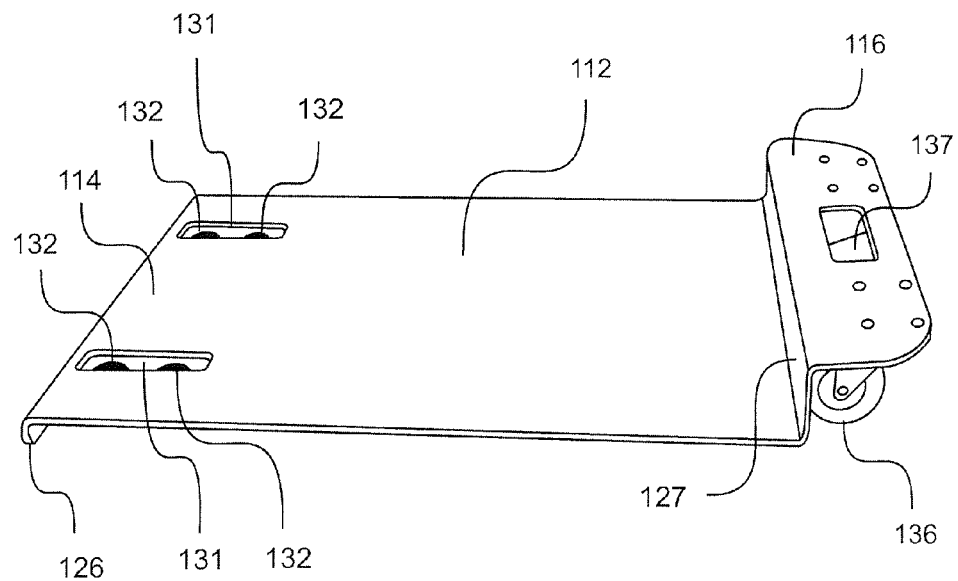
FIG. 8 is a perspective view of another embodiment according to the present invention.
Figure 9:
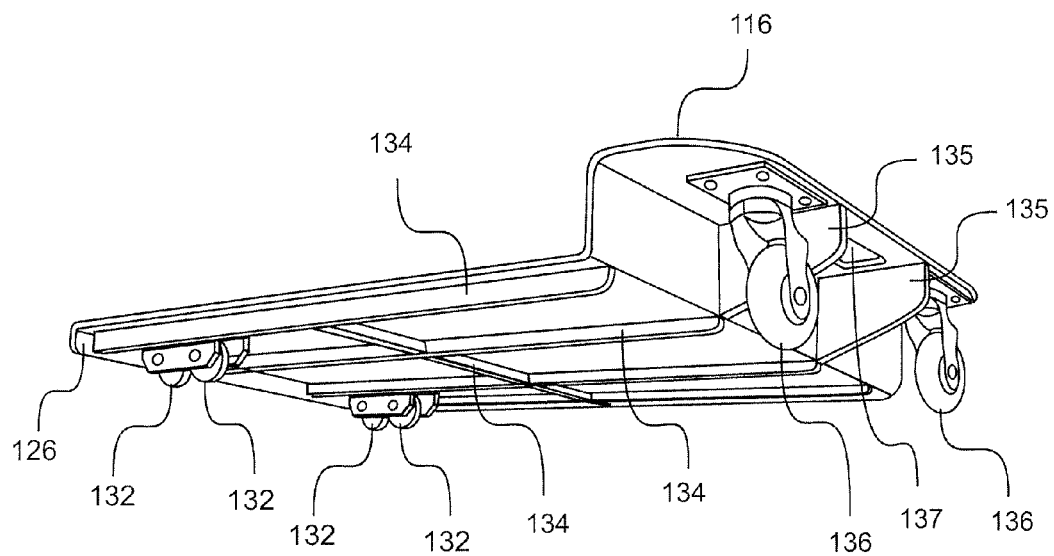
FIG. 9 is a second perspective view of another embodiment according to the present invention.
Figure 10:
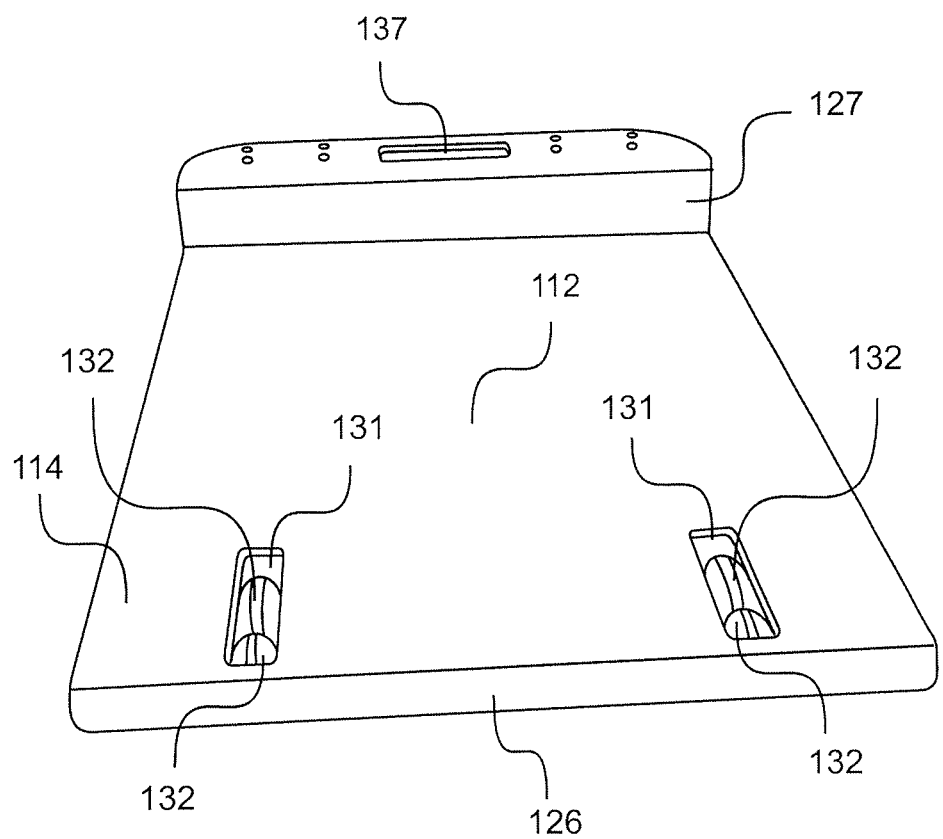
FIG. 10 is a third perspective view of another embodiment according to the present invention.

As shown in FIGS. 8 to 10, another embodiment according to the present invention is a low profile dolly 100 which operates in one mode. The dolly comprises a generally planar platform 112 having opposed front 114 and raised rear 116 ends, which are parallel to platform 112. Rear end 116 is bent or otherwise configured upwardly from platform 112, with an intermediate panel 127 approximately normal to platform 112. Platform 112 may consist of a single solid rectangular sheet, as illustrated in FIGS. 8 to 10 or it may have one or more cut out portions (not shown) to reduce the overall weight of the dolly and decrease the physical demand on the user.

Front end member 126 is bent or otherwise configured downwardly from platform 112 to form a bumper. Optionally, additional bumpers may protrude from the sides of the platform for additional durability (not shown). Platform 112, front 114 and raised rear 116 ends, front end member 126 and intermediate panel 127 may be formed from a single, relatively thick (⅜") monolithic heavy plate of steel or other suitable material. Optionally, the surface of platform 112 has a non-skid finish in a diamond pattern or other pattern as is known in the art.

A plurality of wheels 132 are mounted beneath front end 114 and are configured to contact the ground or surface so as to support the platform 112 above the ground or surface. Wheels 132 can be pneumatic or solid. Front end 114 has a plurality of slots 131 positioned above wheels 132, which enable wheels 132 to mounted such that the upper tread of wheels 132 is approximately ¼" below the surface of platform 112. Advantageously, this reduces the overall profile of the dolly. As such, the top surface of platform 112 is about no more than 1 inch above the ground or surface.

Raised rear end 116 has a pair of wheels 136 located underneath at opposing lateral sides. Wheels 136 are preferably relatively large caster wheels, with optional braking means (not shown) such as conventional toe operated brake levers on the axles. Wheels 132 are preferably free rolling at all times and are not equipped with brakes. Raised rear end 116 optionally includes slot 137, which is configured to accept a variety of lifting levers.

The underside of platform 112 includes a plurality of support members 134 to provide structural support to the dolly. The underside of raised rear end 116 also includes a plurality of support members 135 for structural support.

This embodiment is readily suitable for use by a single operator and is ideally suited for carrying filing cabinets, appliances or other heavy items of furniture. In the embodiment that does not have side bumpers, shown in FIGS. 8 to 10, the dolly can support loads that extend past the dolly's width. As wheels 132 are clear of platform 112, the load can sit atop slots 131 without hindering the dolly movement and operation.

Thus, it is apparent that there has been provided in accordance with the embodiments of the present invention a dolly that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A low-profile dolly comprising:
    a fixed, generally planar platform having opposed front and rear ends and lateral sides, the front end and lateral sides being open;
    an intermediate panel having two ends, one end being coupled to the platform at about ninety degrees and the other end being coupled to a raised rear end at about ninety degrees, the raised rear end being about parallel to the platform and extending across the width of the dolly;
    a plurality of wheels mounted to the dolly at the front and rear ends, the plurality of wheels being configured to contact a surface so as to support the platform above the surface when the dolly is placed on the surface, the platform and the raised rear end being supported by the wheels above the surface for selectively carrying a load;
    the wheels at the front end being smaller than the wheels at the rear end and being configured such that the platform is relatively close to the surface;
    the wheels at the rear end being located underneath the raised rear end at opposing lateral sides.

2. A dolly according to claim 1, wherein the platform consists of a rectangular sheet having at least one cut out portion.

3. A dolly according to claim 1, further comprising slots in the platform at the front end above one or more of the wheels, the platform being no higher than one inch above the surface.

4. A dolly according to claim 3, wherein the wheels at the front end comprise an upper tread, the upper tread located approximately a quarter inch below the surface of the platform.

5. A dolly according to any claim 1, wherein the platform is made of a monolithic plate of metal.

6. A dolly according to claim 1, wherein the platform further comprises an upper face and the upper face of the platform has a non-skid finish.

7. A dolly according to claim 1, wherein the platform is further configured downwardly to form a bumper on the front end.

8. A dolly according to claim 7, wherein the platform is further configured downwardly to form a bumper on the lateral sides.

9. A dolly according to claim 1, wherein the wheels supporting the raised rear end are casters.

10. A dolly according to claim 9, wherein the wheels supporting the raised rear end have braking means.

11. A dolly according to claim 1, wherein the platform is no higher than one inch above the surface.

12. A dolly according to claim 1, wherein the raised rear end comprises a slot for accepting a lifting lever.

13. A dolly according to claim 1, wherein the platform comprises support members for structural support.

14. A dolly according to claim 1, wherein the raised rear end comprises support members for structural support.

15. A low-profile dolly comprising:
    a fixed, generally planar platform having opposed front and rear ends and lateral sides, the front end and lateral sides being open;
    an intermediate panel having two ends, one end being coupled to the rear end of the platform at about ninety degrees and the other end being coupled to a raised rear end at about ninety degrees, the raised rear end being about parallel to the platform;
    rear caster wheels mounted underneath the raised rear end;
    a plurality of front wheels mounted underneath the front end of the platform;
    the platform and the raised rear end being supported by the wheels above a surface for selectively carrying a load; and
    the platform comprising slots positioned above the front wheels, into which the front wheels are adapted to be mounted to the platform, the platform being relatively close to the surface.

16. A dolly according to claim 15, wherein the platform comprises support members for structural support.

17. A dolly according to claim 15, wherein the raised rear end comprises support members for structural support.

18. A dolly according to claim 15, wherein the rear caster wheels have braking means.

19. A dolly according to claim 15, wherein the platform is configured to support a load which overhangs the platform, the platform being no higher than one inch above the surface.

* * * * *